April 3, 1945. R. M. ELLIS ET AL 2,372,772
FLANGED NUT AND MANUFACTURE THEREOF
Filed Nov. 14, 1942 2 Sheets-Sheet 1
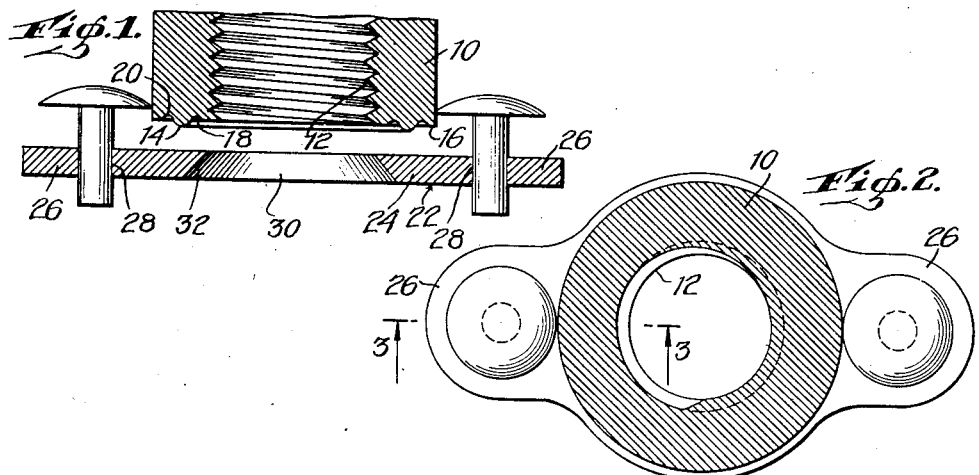
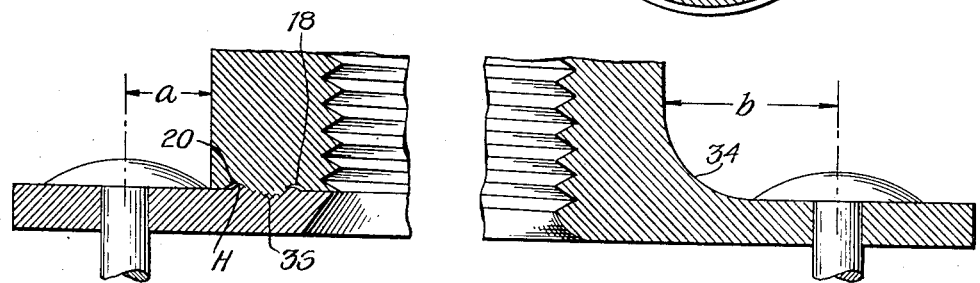
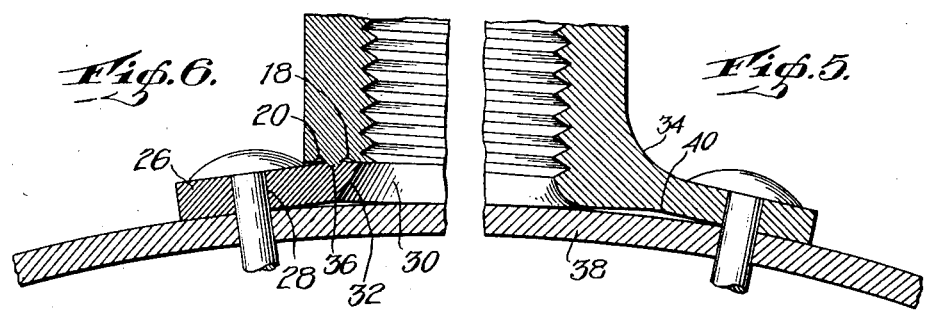
INVENTORS
Robert M. Ellis
Daniel C. Kingsford
BY
their ATTORNEY

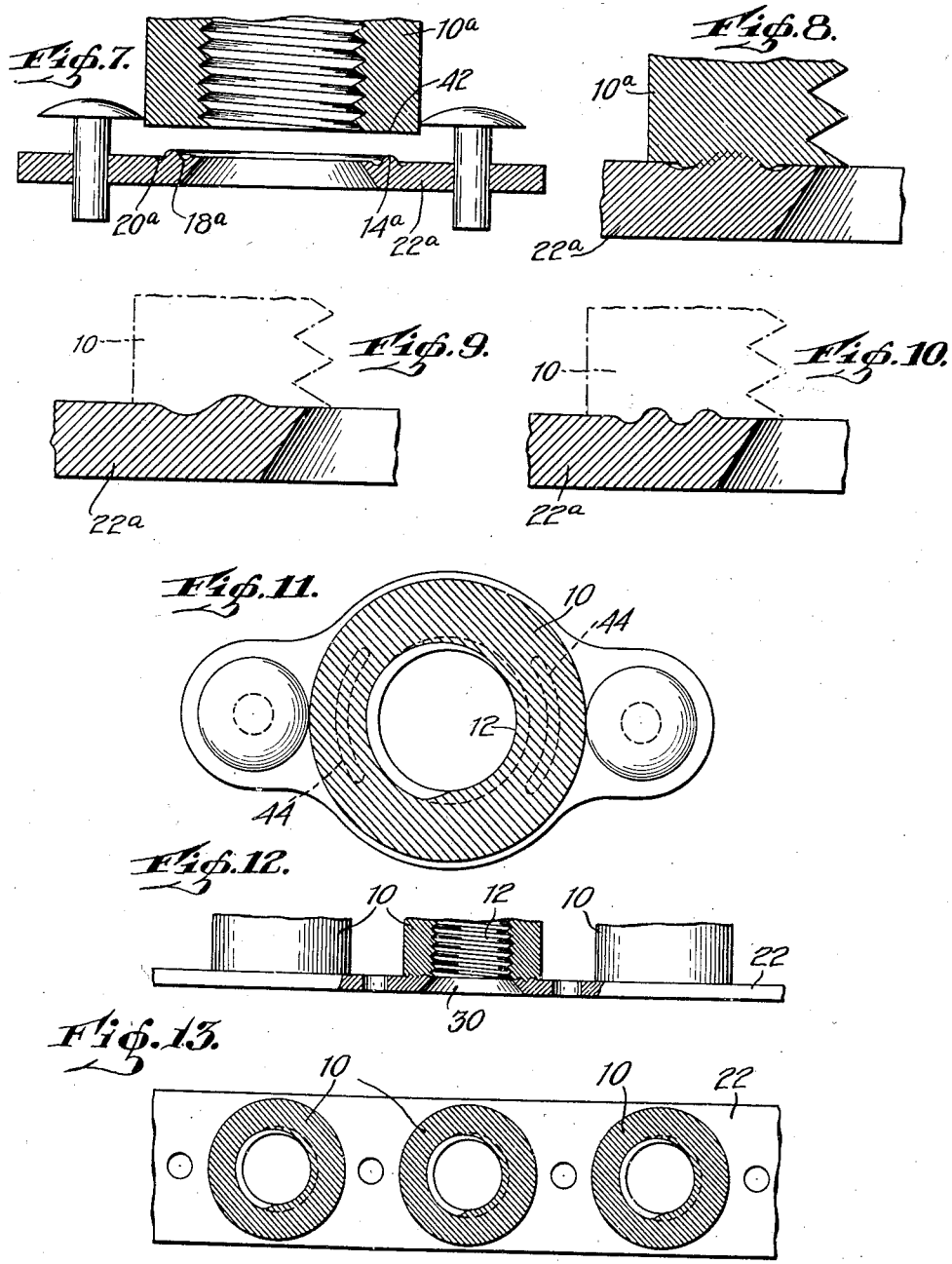

Patented Apr. 3, 1945

2,372,772

UNITED STATES PATENT OFFICE 2,372,772

FLANGED NUT AND MANUFACTURE THEREOF

Robert M. Ellis, North Arlington, and Daniel C. Hungerford, Madison, N. J., assignors to Aircraft Parts Development Corporation, Summit, N. J., a corporation of Delaware Application November 14, 1942, Serial No. 465,526

6 Claims. (Cl. 85—32)

The present invention relates to flanged nuts and the manufacture thereof and has particular reference to flanged nuts of the kind generally known in the trade as "anchor nuts," which are characterized by a nut body having one or more relatively thin flanges or tabs projecting laterally from the base of the nut for attaching the nut by riveting, welding, adhesion or other means, to another body to which the nut is to be fixed.

Nuts of the above character are employed in very large numbers, particularly in the aircraft industry, where it is desired to provide a threaded anchorage for screws or bolts on a structure such as thin sheet metal, which cannot itself be provided with a satisfactory threaded aperture for receiving bolts or screws.

Heretofore nuts of the character under consideration, which for convenience will hereinafter be referred to as anchor nuts, have been and are manufactured in several different ways. One method is to machine the nuts from bar stock having a diameter sufficiently large to equal the maximum transverse dimension across the flanges or tabs of the nut, the body portion of the nut being turned down from such stock on automatic screw machines or the like. This method is expensive both because of the large percentage of scrap resulting from the procedure and also because of the machine time required to form a suitable nut blank. Another method is to upset or cold forge one end of a piece of bar stock having a diameter equal to the diameter of the desired nut body, to form a laterally extending button-like flange projecting from the body portion which may by subsequent operation be trimmed to provide a tab or tabs of the desired configuration. Still another method is to perform a series of deep drawing operations on sheet stock having approximately the thickness of the desired flanges or tabs, to form a body portion consisting of a tubular extension which is subsequently threaded to form the nut body.

All of the above methods, while commercially practical and in use in the manufacture of certain types of anchor nuts, have definite limitations which render them either impractical or undesirable in many instances, and a general object of the present invention is the provision of a new and improved form of flanged or anchor nut having definite advantages over nuts of this character as heretofore produced by existing methods and in the provision of novel and improved manufacturing methods providing features of economy and flexibility in the production of nuts of different sizes and types enabling a superior product to be produced more cheaply and readily than heretofore has been possible, particularly nuts made from special or critical materials such as stainless steel.

For a better understanding of the detailed nature of the invention and the manner in which the above and other and more detailed objects which will hereinafter appear are obtained, together with the advantages to be derived from the use of this invention, reference may best be had to the ensuing portion of this specification taken in conjunction with the accompanying drawings in which, Fig. 1 is an exploded sectional view of a nut structure embodying the principles of the invention;

Fig. 2 is a top plan view of the structure shown in Fig. 1;

Fig. 3 is a fragmentary sectional view, on enlarged scale, of a portion of the structure shown in Fig. 1 after the parts have been united;

Fig. 4 is a fragmentary sectional view showing the corresponding portion of a conventional flanged nut;

Fig. 5 is a fragmentary sectional view showing a conventional nut of the kind shown in Fig. 4 applied to a curved sheet;

Fig. 6 is a fragmentary sectional view similar to Fig. 5 showing a nut embodying the present invention applied to a curved sheet;

Fig. 7 is a view similar to Fig. 1 showing another form of nut embodying the invention;

Fig. 8 is a fragmentary view on enlarged scale, similar to Fig. 3, showing the parts of the nut of Fig. 7 after they are united;

Fig. 9 is a fragmentary view illustrating another form of projection for welding in accordance with the invention;

Fig. 10 is a view similar to Fig. 9 illustrating the use of multiple projections for welding;

Fig. 11 is a plan view showing the use of interrupted projections;

Fig. 12 is a sectional view showing the application of the invention to a multiple nut structure, and Fig. 13 is a plan view of the structure shown in Fig. 12.

In accordance with the principles of the present invention we propose to provide anchor nuts of built-up welded construction in which the body portion of the nut and the flanged portion consist of separate pieces welded together, the nature and character of the weld providing what may be termed as internal fillet, the utility and advantages of which will appear as this description proceeds.

In order to illustrate more clearly the nature of this construction, we have shown in Fig. 1 an exploded sectional view of one example of anchor nut embodying the principles of the invention and of the kind adapted to be riveted to the structure to which it is to be attached. In this figure the nut body is indicated at 10 and preferably, although not necessarily, is made from bar stock to provide a body of circular cross section as shown in Fig. 2. This body is provided with a threaded bore 12 and the base end of the body is formed to provide a circular projecting ridge 14, the apex of which projects slightly beyond the plane 16 of the base face of the nut body. Shallow grooves 18 and 20 are formed adjacent to the projection 14 radially inside and outside of the projection, respectively. A base or flange plate 22 is stamped or otherwise suitably formed from sheet material to provide a central portion 24 adapted to underlie the nut body and having one or more anchoring flanges or tabs 26. In the example shown in Fig. 2, two such tabs are shown, each tab being provided with a rivet hole 28 for the reception of a suitable anchoring rivet.

The base or flange plate is further provided with a central aperture 30 the diameter of which is at least as large and preferably slightly larger than the threaded nut bore and the perimeter of which is advantageously beveled as at 32 to provide a countersunk entrance to the nut bore when the nut is assembled. The component parts are joined together by fusion welding of the kind well known in the art as "projection" welding, this step advantageously being performed on a projection welding machine which is a well known article of commerce and need not be described herein for an understanding of the present invention.

When the parts are welded together the projection or rib 14 fuses into the base portion 24 of the flange plate 22 as indicated in Fig. 3 and some metal flows into and may perhaps fill but not adhere to the grooves 18 and 20 lying at either side of the projection. The nature of this weld is such as to produce in effect a filleted juncture between the flange plate and the nut body and the filleted nature of this junction point constitutes an important factor in the structure of nuts embodying the present invention. As is well known, a structure having joining surfaces disposed at a substantial angle with respect to each other, is relatively weak unless a fillet is provided at the juncture of such surfaces, and previous experience with anchor nuts has shown that a fillet between the nut body and the anchoring tab or tabs is essential to a satisfactory nut. Otherwise, the nuts are so weak and brittle at the place of juncture that the tabs are likely to and frequently do snap off when being installed or while in service, at the sharp corner between the nut body and the flange. Heretofore this difficulty has been overcome by providing such nuts, regardless of their specific mode of manufacture, with an external fillet such as that shown at 34 in Fig. 4. In accordance with this invention the required fillet is provided by the nature of the welded joint, particularly the portion indicated at 36. By removing the location of the fillet from the previously employed external location to an internal location numerous valuable practical advantages are obtained.

In the first place, the maximum diameter of the nut body may be held to the minimum dimension required to provide the necessary characteristics for the nut body and as a result the length of the tab or tabs required on the nut may be made less than in the case of a nut having an external fillet, particularly in the case of riveted nuts. In the case of a riveted type of nut the apertures for the rivets may be made closer to the nut body when the present invention is employed than would otherwise be possible, by an amount equal to the radius of the usual external fillet, as will be apparent from comparison of Figs. 3 and 4, Fig. 3 indicating at $a$ the distance that the center line of the rivet hole is required to be located in the flange outwardly of the nut body in a nut embodying the present invention while $b$ in Fig. 4 indicates the relatively greater distance required for the center line of the opening to be placed outwardly of the nut body in a nut of conventional construction.

Both weight and costs of material are highly important factors for anchor nuts of the kind of which many hundreds of millions are employed in the aircraft industry and the saving in both weight and material which can be effected by the present invention is of substantial importance.

Other advantages which are also important are derived from constructions in accordance with the present invention. In a great many instances anchor nuts are required to be secured to curved rather than flat surfaces and the internal fillet construction characteristic of the present invention provides a nut which is more readily and satisfactorily adjustable to a curved surface than nuts having external fillets. This is readily observable from comparison of Figs. 5 and 6. In Fig. 5 a conventional externally filleted nut is shown riveted to a curved plate 38 and as will be observed from this figure, the base of the nut is rigid and flat over an area extending to the outer radius of the externally located fillet. Consequently when the nut is riveted onto a curved plate, this relatively large central portion of the base of the nut does not flex and the tab is bent to a sharper radius of curvature than that of the plate 38, at point 40, which is undesirable both from the standpoint of excess flexure of the tab and also from the standpoint of the area of the base of the nut which does not bear against the plate to which it is secured.

On the other hand, with a nut embodying the present invention, the rigid portion of the base of the nut is of much less diameter than in conventional practice and the tab when riveted onto a curved surface may bend much more freely and from a smaller radius than in conventional practice, as shown in Fig. 6. Thus with the improved construction less sharp flexure of the tab and better seating of the nut on the curved surface is obtained. When projection welding is employed, the base or flange plate is not ordinarily fused to the nut body over the area radially outside of the outer groove 20 and consequently if the plate 38 is relatively sharply curved, the base plate may bend away from the nut body to some extent outside of the line of welding, but this is not in any way harmful.

While in the example above described, the parts before assembly are shown with the nut body having the welding projection and grooves formed on its base face for engagement with a flat surfaced base plate, this procedure need not necessarily be followed but may be reversed as shown in Figs. 7 and 8 in which the nut body 10a is shown with a plane base face 42 while the base plate 22a is shown as provided with a welding projection 14a and grooves 18a and 20a. When these parts are welded, as shown in Fig. 8, the action is similar to that previously described, the projection 14a fusing into the base of the nut body with a certain amount of metal filling or partially filling the grooves 18a and 20a. In some instances, from a manufacturing standpoint, the last described embodiment may be preferable since in preparing the base plate 22a the projection and grooves can readily be formed by a coining operation at the time when the blank is stamped or otherwise formed to desired configuration.

The profile of the welding projection or projections may vary considerably depending upon the specific nut to be produced. Thus in some instances, as for example for very small nuts, one of the grooves may be omitted as illustrated in Fig. 9. Again, particularly for large nuts, multiple projections may be employed as shown in Fig. 10 and such projections may each have associated therewith one or two grooves, as desired. In Figs. 9 and 10 the variants have been shown formed on the base plate but it will be obvious that the several variations may with equal facility be formed in the base surface of the nut body.

Also while we consider it desirable to provide an uninterrupted annular projection and grooves for welding the parts together, it is not essential in all cases that this be done since sufficient strength is obtainable for the purposes of anchor nut usage with less than a complete peripheral weld. As shown in Fig. 11, the welded areas, indicated at 44, may be limited to those parts of the periphery adjacent to the places where the tabs project from the nut body, or other disposition of the weld areas may be made.

In addition to the advantages above enumerated, the invention enables several further important practical advantageous results to be obtained. In cases where relatively large and heavy nuts are required, the welded nut characteristic of the present invention is particularly advantageous from a cost standpoint since the size of anchor nuts which can be flanged by the upsetting or forging process is definitely limited and the method which embodies drawing the nut body from sheet material is limited to relatively light gauge metal. Consequently, the only practical method heretofore known or employed in making large anchor nuts has been that of machining them from bar stock having a diameter at least as great as the overall flange diameter of the nut. This process is extremely wasteful both as to material and machine time. In the case of nuts required to be made from stainless steel the upsetting or forging method will not work because of the nature of the material and here again the method previously relied upon has been that of the machining large diameter bar stock to form the nut bodies. This is an extremely wasteful method because of the relatively high cost of the material and the high percentage of scrap. On the other hand, this material is exceedingly well adapted for projection welding and satisfactory anchor nuts may be rapidly and easily made in accordance with the present invention at greatly reduced costs.

In many cases special requirements dictate the use of extremely thin anchoring flanges or tabs, which precludes the use of the drawing process because of the material having insufficient body to permit proper threading of the drawn nut blank, and which also precludes the upsetting method of forming the flanges because of the splitting of the upset material if the flange thickness is attempted to be made below a certain minimum. Other special requirements often require heavier than normal flange thicknesses which again precludes the use of either the drawing or the upsetting method. By the use of the present invention flange thicknesses of either unusually small or large dimensions present no problem.

A still further advantage to be derived from this invention is that in many instances it is desirable to have for special application, anchor nuts having exceptionally hard and strong threaded bodies while at the same time having relatively soft and ductile anchoring flanges or tabs. This requirement is readily met by the present invention where materials of different characteristics may be welded together, as, for example, a nut body of hardening steel and a flange or base plate of mild steel.

Anchor nuts as employed today are required in very large numbers of different sizes and types and the present invention is highly advantageous in meeting production demands for different ones of these kinds and types. Thread sizes and pitches are standardized, while the numbers and contours of flanges are of great variety of shape and size in order to fit into special locations for special uses. By virtue of the present invention nut bodies having standard thread characteristics of different sizes may be maintained in stock and joined to flange or base plates of any desired size and contour by cheap mass production methods since the latter parts can readily be made up cheaply and rapidly with a minimum of special tooling to meet any special specifications. This in turn permits designers a wider latitude in choice of design for anchor nuts for this required purposes since special and unusual forms can readily be supplied at low cost, whereas heretofore the costs of special and unusual types have usually been so high as to preclude their use. The flexibility afforded by the present invention also renders it readily feasible to manufacture gang assemblies of nuts, which are frequently required, by the simple procedure of welding a plurality of nut bodies to a common suitably apertured base or flange strip as shown in Figs. 12 and 13.

A further desirable feature which the present invention provides is that the grain structure of the metal in the nut when made of the usual available materials is longitudinal of the axis of the nut bore in the nut body, thus affording the most desirable structure for threading, and longitudinal of the plane of the base or flange plate, thus affording the most desirable character of structure from the standpoint of ductility and flexibility of this portion which may require to be bent.

In the majority of instances anchor nuts find their greatest utility and are used in greatest quantities when provided with some self-locking feature associated with the threaded or body portion of the nut for retaining against dislodgment due to vibration, the bolt or screw threaded through the nut. In anchor nuts embodying the present invention any one of a number of known self-locking expedients may be incorporated in the nut body, such for example as a non-metallic locking washer incorporated in a suitable recess in the upper end of the nut body in accordance with the invention of G. T. Rennerfelt disclosed in United States Patent No. 1,550,282, or the nut body may be of all metal construction involving out of phase thread sections as for example in the form of nut disclosed in Hungerford patent application Serial No. 229,268 and Luce Patent No. 2,196,637.

Because of the fact that this invention is generic in its application either to plain threaded nuts or self-locking nuts, we have in illustrating the invention not shown by way of example any one particular species of nut body insofar as the portion thereof involving thread engagement with a screw or bolt is concerned, the invention being generic to all known forms of either standard or special thread engaging means between the nut and the bolt or screw received thereby.

It will be evident that insofar as sequence of operations is concerned the sequence or order in which the various steps of manufacture are performed may vary widely with respect to the welding operation. Thus the welding may be performed to join unfinished parts, with operations such as threading, the incorporation of a self-locking feature if such is used, and the trimming and/or punching or other treatment of the flanges or tabs carried out later, or the component body and base plate parts may be completed prior to welding, since among other things the projection welding can readily be so controlled as to prevent any flash therefrom from flowing into or otherwise interfering with or blocking a previously formed thread in the nut body.

From the foregoing it will be apparent that the invention may be embodied in many different specific forms of nut structure and the invention is accordingly to be considered as not limited to the species shown herein by way of example but as embracing all that falls within the scope of the appended claims.

What is claimed is:

1. An anchor nut comprising a body member having a threaded bore therein and a base surface encircling said bore and a base member having one or more anchoring portions projecting laterally beyond the boundary of said base surface, said members being joined by the fusion weld of a projection on one of said members to the other of said members, and a recess in the surface of one of said members immediately adjacent to said weld, said weld and said recess being located between the perimeter of said bore and the boundary of said base surface.

2. An anchor nut comprising a body member having a threaded bore therein and a base surface encircling said bore and a base member having one or more anchoring portions projecting laterally beyond the boundary of said base surface, said members being joined by the fusion weld of a projection on one of said members to the other of said members, and a recess in the surface of one of said members immediately adjacent to each side of said weld, said weld and said recesses all being located between the perimeter of said bore and the boundary of said base surface.

3. An anchor nut comprising a body member having a threaded bore therein and a base surface encircling said bore and a base member having one or more anchoring portions projecting laterally beyond the boundary of said base surface, said members being joined by the fusion weld of an annular projection on one of said members to the other of said members, and an annular recess in the surface of one of said members immediately adjacent to said weld, said weld and said recess being located between the perimeter of said bore and the boundary of said base surface.

4. An anchor nut comprising a body member having a threaded bore therein and a base surface encircling said bore and a base member having one or more anchoring portions projecting laterally beyond the boundary of said base surface, said members being joined by the fusion weld of a projection on said base member to said body member, and a recess in the surface of said base member immediately adjacent to said weld, said weld and said recess being located between the perimeter of said bore and the boundary of said base surface.

5. An anchor nut comprising a body member having a threaded bore therein and a base surface encircling said bore and a base member having one or more anchoring portions projecting laterally beyond the boundary of said base surface, said members being joined by the fusion weld of a projection on one of said members to the other of said members, and a recess in the surface of the member on which said projection is formed and immediately adjacent to said weld, said weld and said recess being located between the perimeter of said bore and the boundary of said base surface.

6. An anchor nut comprising a body member having a threaded bore therein and a base surface encircling said bore and a base member having one or more anchoring portions projecting laterally beyond the boundary of said base surface, said members being joined by the fusion weld of an annular projection on said base member to said body member, and an annular recess in the surface of said base member immediately adjacent to said weld, said weld and said recess being located between the perimeter of said bore and the boundary of said base surface.

ROBERT M. ELLIS.
DANIEL C. HUNGERFORD.